United States Patent
Katayama et al.

(12)

(10) Patent No.: US 6,610,767 B1
(45) Date of Patent: Aug. 26, 2003

(54) ANTISTATIC INORGANIC FILLER, RESIN COMPOSITION CONTAINING THE FILLER AND METHOD FOR PREPARING THE INORGANIC FILLER

(75) Inventors: Seiji Katayama, Tokyo (JP); Yumiko Takase, Tokyo (JP); Ryoji Itoh, Tokyo (JP); Toshiaki Matsushige, Kyoto (JP); Koji Mita, Kyoto (JP)

(73) Assignees: Fimatec Ltd., Minato-Ku (JP); San Nopco Limited, Kyoto (JP)

( * ) Notice: Subject to any disclaimer, the term of this patent is extended or adjusted under 35 U.S.C. 154(b) by 0 days.

(21) Appl. No.: 09/327,514

(22) Filed: Jun. 8, 1999

(51) Int. Cl.⁷ .................................................. C08K 5/42
(52) U.S. Cl. ........................ 524/156; 524/157; 524/236; 524/425
(58) Field of Search ................................. 524/425, 156, 524/157, 236

(56) References Cited

U.S. PATENT DOCUMENTS 5,728,442 A * 3/1998 Noguchi et al. ............ 428/65.3

FOREIGN PATENT DOCUMENTS

| JP | 56-136849 | 10/1981 |
| JP | 59-138267 | 8/1984 |
| JP | 5-263010 | 10/1993 |
| JP | 7-300568 | 11/1995 |

* cited by examiner

*Primary Examiner*—Peter D. Mulcahy
(74) *Attorney, Agent, or Firm*—Burns, Doane, Swecker & Mathis, LLP

(57) ABSTRACT

An antistatic inorganic filler comprises an inorganic filler, an organic dispersant applied onto the surface of the inorganic filler and an organic antistatic agent applied onto the organic dispersant layer. The inorganic filler may be prepared by a method comprising the steps of wet-grinding an inorganic filler in the presence of an organic dispersant, drying the ground inorganic filler and then mixing it with an organic antistatic agent; or a method comprising the steps of wet-grinding an inorganic filler in the presence of an organic dispersant, adding an organic antistatic agent to the resulting slurry of the ground filler and then drying the mixture. The inorganic filler shows an effect of imparting long-lasting antistatic properties to plastic and rubber materials in addition to the effects as the filler such as excellent rigidity, heat resistance and impact resistance.

6 Claims, No Drawings

ANTISTATIC INORGANIC FILLER, RESIN COMPOSITION CONTAINING THE FILLER AND METHOD FOR PREPARING THE INORGANIC FILLER

BACKGROUND OF THE INVENTION

The present invention relates to an antistatic inorganic filler which has an antistatic effect by itself and which can impart antistatic properties to plastic and rubber materials when the inorganic filler is incorporated into these materials; a resin composition containing the inorganic filler; and a method for preparing the inorganic filler.

Fillers, which have conventionally been used in plastic and rubber materials, are surface-treated with a hydrophobic substance such as stearic acid or oleic acid prior to use in order to improve the compatibility to a matrix such as a plastic material. Since the plastic and rubber materials, to which these fillers are incorporated, are quite susceptible to electrification, it has been common to additionally add an antistatic agent to plastic and rubber materials. In addition, it has recently been proposed to previously treat the surface of fillers for incorporating into plastic and rubber materials with an antistatic agent, as described in, for instance, Japanese Un-Examined Patent Publication (hereinafter referred to as "J. P. KOKAI") Nos. Sho 56-136849 and Sho 59-138267. However, the use of antistatic agents suffers from problems such as those described below. If an antistatic agent is specially added, the surface resistivity and/or volume resistivity of these materials are not, in fact, sufficiently reduced and any satisfactory antistatic effect is not always expected in case of, in particular, plastic materials such as polyethylene and polypropylene, which are quite susceptible to electrification. Even if the surface resistivity or the like is reduced or a desired antistatic effect can be obtained, most of the antistatic agent is gradually transferred to the surface of these materials and therefore, the effect thereof is only temporary and is not a long-lasting one.

SUMMARY OF THE INVENTION

An object of the present invention is to provide an antistatic inorganic filler which can serve as a filler and can simultaneously impart long-lasting and excellent antistatic properties to substances such as plastic and rubber materials when the filler is added to these materials.

Another object of the present invention is to provide a resin composition comprising the inorganic filler.

A still another object of the present invention is to provide a method for preparing an antistatic inorganic filler.

The present invention has been developed on the basis of such findings that if an inorganic filler is wet-pulverized in the presence of a dispersant or a water-soluble surfactant and then treated with an antistatic agent, the surface of the inorganic filler is in order covered with the dispersant and the antistatic agent and that the foregoing problems associated with the conventional techniques can effectively be eliminated by the use of the inorganic filler having such a double adsorption layer structure (double layer).

According to a first aspect of the present invention, there is provided an antistatic inorganic filler wherein an organic dispersant is applied onto the surface of an inorganic filler and an organic antistatic agent is then applied onto the layer of the organic dispersant.

According to a second aspect of the present invention, there is provided a resin composition which comprises the foregoing inorganic filler.

According to a third aspect of the present invention, there is also provided a method for preparing an antistatic inorganic filler which comprises the steps of wet-grinding an inorganic filler in the presence of an organic dispersant, drying the pulverized filler, mixing it with an organic antistatic agent.

According to a fourth aspect of the present invention, there is also provided a method for preparing an antistatic inorganic filler, which comprises the steps of wet-grinding an inorganic filler in the presence of an organic dispersant, adding an organic antistatic agent to the resulting slurry of the pulverized filler and then drying the mixture.

DESCRIPTION OF THE PREFERRED EMBODIMENTS

The present invention will hereunder be described in more detail with reference to the following preferred embodiments.

Examples of inorganic fillers to be used in the present invention are various kinds of inorganic substances such as ground calcium carbonate (G.C.C.), precipitated calcium carbonate (P.C.C.), talc, sericite, calcium sulfate, montmorillonite, zeolite, calcium sulfite, aluminum hydroxide, aluminum oxide, zinc oxide, barium sulfate and kaolin, which may be used alone or in any combination. In this connection, calcium carbonate, in particular, ground calcium carbonate is preferably used.

In the present invention, such inorganic fillers may directly be wet-ground, but it is preferred that they are previously dry-ground prior to the wet-grind. In this respect, it is preferred to pulverize the inorganic filler to a particle size of not more than 40 mm and preferably to an average particle size of from about 2 mm to 2 $\mu$.

In the method of the present invention, an organic dispersant is first applied onto the surface of the foregoing inorganic filler. The application of the dispersant may be carried out by a variety of methods, but the inorganic filler is preferably wet-ground in the presence of the organic dispersant to obtain an organic dispersant-coated inorganic filler.

More specifically, the application of an organic dispersant is performed by adding an aqueous medium (preferably water) to an inorganic filler in a weight ratio: inorganic filler/aqueous medium ranging from 70/30 to 30/70 and preferably 60/40 to 40/60; adding a dispersant to the resulting dispersion in an amount, as expressed in terms of the solid content, ranging from 0.01 to 5 parts by weight (solid content) and preferably 0.01 to 0.7 part by weight (solid content) per 100 parts by weight of the inorganic filler and then wet-grinding the filler according to the usual method. Alternatively, an inorganic filler is admixed with an aqueous medium in which a dispersant is dissolved in advance in such an amount that the content of the dispersant falls within the range specified above, followed by wet-grind of the filler according to the usual method. The wet-grind may be batch-wise or continuous type one and it is preferred to use media mills which make use of grinding media such as a sand mill, an atrittor, a ball mill. If the inorganic filler is wet-ground in this manner, the resulting filler has an average particle size of not more than 2 $\mu$m and preferably 1 to 0.3 $\mu$m.

Examples of organic dispersants usable in the present invention are (A) water-soluble cationic surfactants, (B) water-soluble anionic surfactants and (C) water-soluble nonionic surfactants.

The water-soluble cationic surfactant (A) used herein as the organic dispersant may be, for instance, primary, secondary and tertiary amine salt type cationic low molecular weight or high molecular weight surfactants and quaternary ammonium salt type cationic low molecular weight or high molecular weight surfactants.

Specific examples of the primary to tertiary amine salt type surfactants are higher alkylamine salts, higher alkylamine ethylene oxide adducts, higher alkylamine ethylene oxide/propylene oxide adducts, SOROMINE A (former I.G. product) type amine salts, SAPAMINE A (former Ciba; now Ciba Geigy Corp. product) type amine salts, AHCOVEL A (Arnold Hoffman Co. product) type amine salts and imidazoline type amine salts.

The quaternary ammonium salt type low molecular weight surfactants may be, for instance, higher alkyl trimethyl ammonium salts, alkyl dimethylbenzyl ammonium salts, SAPAMINE type quaternary ammonium salts, imidazoline type quaternary ammonium salts and alkyl pyridinium salts.

The primary to tertiary amine salt type high molecular weight surfactants may be, for instance, polyethylene imines, polyalkylene polyamine salts, salts of polyaminedicyandiamide condensates and polydiallylamine salt. The quaternary ammonium salt type high molecular weight surfactants may be, for instance, polystyrene methylaminotrimethyl ammonium salts polydiallyl dimethylammonium salts, trimethylaminoethyl (meth) acrylate ammonium salts and poly(N-alkyl pyridine) salts.

Among these cationic surfactants, if the filler used is, for instance, calcium carbonate, preferably used are amine salt type high molecular weight surfactants or quaternary ammonium salt type high molecular weight surfactants in order to obtain a slurry having a high concentration during the wet-grind, with salts of diallylamine homopolymers or copolymers thereof with vinyl compounds and polydiallyl dimethylammonium salts being particularly preferred as the cationic surfactants. As such high molecular weight dispersants, preferably used are, for instance, water-soluble cationic copolymer dispersants such as those described in J. P. KOKAI No. Hei 7-300568. The disclosure of J. P. KOKAI No. Hei 7-300568 concerning the water-soluble cationic copolymer dispersants is incorporated herein by reference. The molecular weights of these dispersants are not restricted to any specific range, but preferably ranges from 1000 to 150000 and more preferably 5000 to 80000. Specifically, copolymers of 60 to 99 mole % of diallylamine salt and 40 to 1 mole % of acrylamide are preferable. A water-soluble cationic polymer comprising, as structural units, 10 to 90 mole % of a diallylamine salt and/or an alkyldiallylamine salt and 1 to 99 mole % of an acrylamide monomer is also preferable.

As the water-soluble surfactants (B) used herein as the organic dispersants, there may be listed, for instance, low molecular weight or high molecular weight surfactants having, as functional groups, residues of carboxylic acid salts, sulfuric acid ester salts, sulfonic acid salts and/or phosphoric acid ester salts.

Examples of the low molecular weight carboxylic acid salts include higher fatty acid salts such as sodium laurate, sodium stearate and sodium oleate, higher alcohol polyethylene oxide ether-acetic acid salts and perfluoroalkyl carboxylic acid salts; examples of high molecular weight carboxylic acid salts include homopolymers of carboxylic acid monomers or copolymers of at least two of them or salts thereof such as polyacrylic acid salts and salts of polyacrylic acid-maleic acid copolymers, copolymers of vinyl compounds and carboxylic acid monomers or salts thereof, and carboxymethyl cellulose.

Examples of the low molecular weight sulfuric acid ester salts include higher alcohol polyethylene oxide sulfuric acid ester salts, sulfated oils, sulfated fatty acid esters, sulfated fatty acids, sulfated olefins and alkylphenol polyethylene oxide sulfuric acid ester salts.

Examples of low molecular weight sulfonic acid salts are alkylbenzene-sulfonic acid salts, α-olefin sulfonic acid salts, alkane polysulfonic acid salts, perfluoroalkyl sulfonic acid salts, IGEPON T (former I.G. product) type and AEROSOL (trade name of American Cyanamid Co.) type sulfonic acid salts. In addition, examples of high molecular weight sulfonic acid salts are formalin condensates of naphthalene sulfonic acid salts, polystyrene sulfonic acid salts, polyvinyl sulfonic acid salts, polyaryl sulfonic acid salts, and salts of copolymers of acrylamide with acrylamidopropane sulfonic acids.

Examples of copolymer type polymeric surfactants are copolymers of carboxylic acid monomers with sulfonic acid monomers or salts thereof.

Examples of low molecular weight phosphoric acid ester salts are higher alcohol monophosphoric acid ester salts, higher alcohol polyethylene oxide phosphoric acid ester salts and alkylphenol polyethylene oxide phosphoric acid ester salts.

Among these anionic surfactants, if the filler used is, for instance, calcium carbonate, preferably used are polymeric surfactants in order to obtain a slurry having a high concentration during the wet-pulverization, but particularly preferred are homopolymers of carboxylic acid monomers or copolymers of at least two of them or salts thereof such as polyacrylic acids or salts thereof and polyacrylic acid-maleic acid copolymers or salts thereof. The molecular weights of these anionic surfactants are not restricted to any specific range, but preferably ranges from 1000 to 100000 and more preferably 5000 to 50000.

As the water-soluble surfactants (C) used herein as the organic dispersants, there may be listed, for instance, polyethylene glycol type and polyhydric alcohol type nonionic surfactants.

Specific examples of the polyethylene glycol type surfactants are higher alcohol-ethylene oxide adducts, alkylphenol-ethylene oxide adducts, fatty acid-ethylene oxide adducts, polyhydric alcohol fatty acid ester-ethylene oxide adducts, fatty acid amide-ethylene oxide adducts, polypropylene glycol-ethylene oxide adducts and polyether-modified silicones.

Examples of polyhydric alcohol type surfactants are fatty acid esters of glycerol, fatty acid esters of pentaerythritol, fatty acid esters of sorbitol and sorbitan, fatty acid esters of sucrose, alkyl ethers of polyhydric alcohols, polyglycerin fatty acid esters or ethylene oxide adducts thereof and fatty acid amides of alkanolamines. Examples of surfactants of this type usable herein also include methyl cellulose (MC), hydroxyethyl cellulose (HEC), polyvinyl alcohol (PVA), polyalkylene oxide vinyl ether compounds and polyhydroxyalkyl (meth) acrylates.

Among these nonionic surfactants, if the filler used is, for instance, calcium carbonate, preferably used are polymeric surfactants in order to obtain a slurry having a high concentration during the wet-pulverization, but particularly preferred are partially saponified polyvinyl alcohol having a low degree of polymerization and polyhydroxyalkyl (meth) acrylates.

In the present invention, the surface of the inorganic filler is treated with an organic antistatic agent after the wet-grind to thus give an antistatic inorganic filler. According to preferred embodiments, for instance, (1) the filler is wet-ground, followed by drying and then mixing it with an organic antistatic agent; or (2) the filler is wet-ground, followed by addition of an organic antistatic agent to the resulting slurry and then drying.

More specifically, in the method (1), it is preferred to prepare the antistatic inorganic filler of the present invention by wet-grinding a filler material, then drying, disintegrating and classifying it, thereafter mixing the pulverized filler with an organic antistatic agent (preferably a cationic antistatic agent and/or a nonionic antistatic agent) using a Henschel mixer or a ribbon mixer.

In the method (2), the antistatic inorganic filler of the present invention is preferably prepared by wet-grinding a filler material to give a slurry, adding an organic antistatic agent (an anionic antistatic agent, a cationic antistatic agent and/or a nonionic antistatic agent, preferably an anionic antistatic agent), mixing with stirring, and then drying, disintegrating and classifying the mixture. In this method, if cationic and/or nonionic antistatic agents are used, the disintegration and classification steps after the drying step can be omitted.

The drying step in the foregoing methods may be any conventionally known method such as hot air drying and spray drying, but it is preferred to carry out the drying step by medium-flow drying. The medium-flow drying is a method for drying a variety of substances comprising the step of supplying a substance in the form of a slurry to a mass of medium balls (fluidized layer) in a drying tower, which are in the fluidized state by the action of hot air. In the drying tower, the substance in the slurry supplied thereto is dispersed in the fluidized layer while adhering, in the form of a film, to the surface of the actively fluidized medium particles and dried by the drying action of the hot air. Such medium-flow drying may preferably be carried out using, for instance, a medium-flow dryer available from Nara Machine Manufacturing Co., Ltd., i.e., Media Slurry Dryer. This is because the use of this medium-flow drying permits the drying of substances to be dried, simultaneously with the conversion of agglomerates into individual primary particles.

The organic antistatic agents used in the foregoing methods or the cationic, anionic and nonionic antistatic agents may, for instance, be those listed below.

The organic cationic antistatic agents may be the foregoing water-soluble surfactants (A) listed above in connection with the dispersants, but particularly preferred are water-dispersible or water-soluble alkylamine-ethylene oxide adducts, alkylamine ethylene oxide/propylene adducts and quaternary ammonium salt type cationic low molecular weight surfactants.

The organic anionic antistatic agents may be the water-soluble surfactants (B) listed above in connection with the dispersants, but particularly preferred are low molecular weight surfactants carrying residues of sulfuric acid ester salts, sulfonic acid salts and/or phosphoric acid ester salts as water-dispersible or water-soluble functional groups. Among these, an α-olefin sulfonic acid salt and/or an alkyl alcohol-ethylene oxide adduct sulfate is preferable.

The organic nonionic antistatic agents may be the water-soluble surfactant (C) listed above in connection with the dispersants and may further be selected from water-dispersible ones having the same compositions. Particularly preferred are, for instance, polyhydric alcohol type nonionic surfactants having an HLB value ranging from 8 to 13, partially saponified polyvinyl alcohols having a low degree of polymerization and polyhydroxyalkyl (meth)acrylates.

In the present invention, it is preferred to use the organic antistatic agent in an amount ranging from 0.5 to 15 parts by weight, more preferably 1 to 10 parts by weight and most preferably 2 to 4 parts by weight per 100 parts by weight of the inorganic filler.

In the present invention, cationic, anionic and nonionic organic dispersants may be used in any combination with cationic, anionic and nonionic antistatic agents, but preferably used are combinations of cationic organic dispersants with cationic antistatic agents; cationic organic dispersants with anionic antistatic agents; anionic organic dispersants with cationic antistatic agents; anionic organic dispersants with anionic antistatic agents; nonionic organic dispersants with cationic antistatic agents; nonionic organic dispersants with anionic antistatic agents. More preferably used are combinations of cationic organic dispersants with anionic antistatic agents; anionic organic dispersants with anionic antistatic agents; and nonionic organic dispersants with anionic antistatic agents, and most preferably used are combinations of cationic organic dispersants with anionic antistatic agents; and anionic organic dispersants with anionic antistatic agents.

The antistatic inorganic filler of the present invention may be used in the form of a resin composition by incorporating the filler into a variety of resins, for instance, various kinds of thermoplastic resins such as polyolefins (e.g., polyethylene and polypropylene), polystyrene, polyvinyl chloride, polyvinylidene chloride, polyalkylene terephthalates (e.g., PET) and polyamides; various kinds of rubber materials such as ethylene propylene diene terpolymer (EPDM) and nitrile butadiene rubber (NBR); and thermosetting resins. Among these resins, suitably used are polyolefins, NBR and EPDM, with polypropylene being particularly preferred. The resin composition may be in any form such as pellets, sheets, films, strands and yarns. In addition, the resin composition may be formed into any shape such as intermediate parts or final articles.

The content of the antistatic inorganic filler in the resin composition may be determined depending on various purposes, but preferably ranges from 5 to 80% by weight and more preferably 20 to 60% by weight on the basis of the total weight of the composition.

The composition of the present invention may additionally comprise hydrophobic substances represented by fatty acids such as stearic acid and oleic acid, which permit the surface-treatment of the filler, in order to improve the compatibility of the composition with plastic and/or rubber materials and improve physical properties of the composition.

If calcium carbonate is, for instance, used as the filler, the amount of stearic acid and/or oleic acid to be added as the compatibilizing agents preferably ranges from 0.1 to 10% by weight based on the total weight of the filler composition.

As has been discussed above in detail, if the antistatic inorganic filler of the present invention is added to plastic and rubber materials, the filler can show an effect of imparting long-lasting antistatic properties to these materials in addition to the effects as a filler such as excellent rigidity, heat resistance and impact resistance.

Therefore, the antistatic inorganic filler of the invention has such an advantage that it can substantially eliminate various troubles due to electrification encountered in processes for molding plastic and rubber materials and during the practical use of the final products thereof and thus the filler is quite useful in practical application. Moreover, the resin composition comprising the antistatic inorganic filler of the invention can thus widely be used, for instance, as a material for injection-molded articles such as films, sheets, various kinds of containers and miscellaneous goods for daily use, extrusion-molded articles such as fishing nets and ropes, and blow-molded articles such as bottles.

The present invention will hereinafter be described in more detail with reference to the following Examples, but the present invention is not restricted to these specific Examples at all.

EXAMPLE 1

Slurries of wet-ground inorganic fillers were prepared according to the following methods 1 to 3:

Method 1

To ground calcium carbonate having an average particle size of 8 μm (a product obtained by dry-grinding raw limestone available from Taiheiyo Cement Co., Ltd.), there was added water so that the ratio of the calcium carbonate to water was 40/60, followed by addition of 0.07 part by weight (solid content) of a cationic dispersant per 100 parts by weight of the ground calcium carbonate, wet-grind of the calcium carbonate using a table-type media mill at a packing rate of glass beads (diameter: 1.2 mm) of 170% and a circumferential velocity of 10 m/sec, and then classification thereof through a screen of 350 mesh size.

Method 2

To ground calcium carbonate having an average particle size of 8 μm (a product obtained by dry-grinding raw limestone available from Nihon Cement Co., Ltd.), there was added water so that the ratio of the calcium carbonate to water was 40/60, followed by addition of 0.8 part by weight (solid content) of a nonionic dispersant per 100 parts by weight of the ground calcium carbonate, wet-grind of the calcium carbonate using a table-type media mill at a packing rate of glass beads (diameter: 1.2 mm) of 170% and a circumferential velocity of 10 m/sec, and then classification thereof through a screen of 350 mesh size.

Method 3

To ground calcium carbonate having an average particle size of 8 μm (a product obtained by dry-grinding raw limestone available from Nihon Cement Co., Ltd.), there was added water so that the ratio of the calcium carbonate to water was 70/30, followed by addition of 0.8 part by weight (solid content) of an anionic dispersant per 100 parts by weight of the ground calcium carbonate, wet-grind of the calcium carbonate using a table-type media mill at a packing rate of glass beads (diameter: 1.2 mm) of 170% and a circumferential velocity of 10 m/sec, and then classification hereof through a screen of 350 mesh size.

The wet-ground product (slurry) thus prepared was treated with an antistatic agent according to the following Method A, B or C to thus prepare antistatic ground calcium carbonate.

Method A

The wet-ground slurry was dried using medium-flowing dryer (available from Ogawara Machine Manufacturing Co., Ltd.), followed by mixing, with stirring, the resulting ground calcium carbonate powder with 2 parts by weight (solid content) of an antistatic agent per 100 parts by weight of the powder in a Henschel mixer to give antistatic ground calcium carbonate.

Method B

To 100 parts by weight of the solid content of the wet-ground slurry, there was added 2 parts by weight (solid content) of an antistatic agent, followed by mixing these ingredients using a desk stirring machine (1200 rpm), drying the mixture in a hot air dryer maintained at 120° C., and then disintegration in a pulverizer to give antistatic ground calcium carbonate.

Method C

Antistatic ground calcium carbonate was prepared by repeating the same procedures used in Method A except that 6 parts by weight (solid content) of the antistatic agent was added.

The organic dispersants and the organic antistatic agents used in the foregoing methods A to C are listed in the following Table 1 and the resulting antistatic inorganic fillers (Samples 1 to 14) are listed in the following Table 2.

TABLE 1-1

| Dispersant | Manufacturer | Trade Name | Chemical Designation |
| --- | --- | --- | --- |
| a | San Nopco Limited | F-2X (cationic)* | Diallylamine type co-polymer |
| b | San Nopco Limited | SN-2X 6300 (nonionic) | Polyhydroxy ethyl acrylate type polymer |
| c | San Nopco Limited | SN-2X 6301 (anionic) | Specially modified polyacrylic acid salt |

*Copolymer of 98 mole % diallylamine salt with 2 mole % acrylamide.

TABLE 1-2

| Antistatic Agent | Manufacturer | Trade Name | Chemical Designation |
| --- | --- | --- | --- |
| d | San Nopco Limited | SN-OX 6302 (anionic) | Sodium α-olefin sulfonate |
| e | San Nopco Limited | SN-OX 6303 (anionic) | Alkyl alcohol (EOA) sulfate |
| f | San Nopco Limited | SN-OX 6304 (anionic) | Alkyl alcohol (EOA) sulfate |
| g | San Nopco Limited | SN-OX 6305 (anionic) | Alkyl alcohol (EOA) sulfate |
| h | San Nopco Limited | SN-OX 6306 (cationic) | Alkyltrimethyl ammonium salt |

TABLE 2

| Sample No. | Prep. Of Wet-ground Slurry | Prep. Of Antistatic CaCO₃ | |
| --- | --- | --- | --- |
| | | Prep. Method | Antistatic Agent |
| 1 | (Dry-ground Product) not processed | Not processed | — |
| 2 | (Dry-ground Product) not processed | A | d |
| 3 | Method 1 | Not processed | — |
| 4 | Method 1 | A | d |
| 5 | Method 1 | B | e |
| 6 | Method 1 | B | f |
| 7 | Method 1 | B | g |
| 8 | Method 1 | B | h |
| 9 | Method 3 | B | d |
| 10 | Method 3 | B | h |
| 11 | Method 2 | B | d |
| 12 | Method 2 | B | h |
| 13 | (Dry-ground Product) not processed | C | d |
| 14 | Method 1 | C | d |

The antistatic inorganic fillers thus prepared each was mixed with polypropylene (MK411B, MK112 available from Japan Polyolefin Co., Ltd.) in a desired ratio, followed by kneading, using a twin roll mill, under the following conditions: front roll temperature of 170° C.; a rear roll temperature of 170° C. and a kneading time of 10 minutes and then forming, by pressing, the kneaded product into a sheet having a thickness of 1 mm under the following conditions: a temperature of 230° C.; a pressure of 150 kgf/cm², a pre-heating time of 2 minutes; and a heating time of 2 minutes.

Test pieces of these rubber systems each was prepared by forming rubber and various kinds of other ingredients into a compound in a cooled roll kneader at 20° C. and then pressing the resulting compound into a sheet having a thickness of 2 mm.

The surface resistivity and volume resistivity of each sheet were determined using Resistivity Chamber available from Advantest Co., Ltd. The results thus obtained are summarized in the following Tables 3 to 6.

| Formulation 1 for Rubber Compound: | |
|---|---|
| EPDM (#4045) | 100 parts by weight |
| ZnO | 5 parts by weight |
| Stearic Acid | 1 part by weight |
| DCP (Parcumill D40) | 4 parts by weight |
| G.C.C. | variable amount |

| Formulation 2 for Rubber Compound: | |
|---|---|
| EPDM or NBR | 100 parts by weight |
| ZnO | 5 parts by weight |
| Stearic Acid | 1 part by weight |
| MBTS | 1.5 part by weight |
| TMTD | 0.2 part by weight |
| S | 2 parts by weight |
| G.C.C. | 90 parts by weight |

TABLE 3

Surface Resistivity of Polyolefin (MK-411B)/Inorganic Filler Subjected to Antistatic Treatment (50/50)

| Sample No. | Just After | 7 Days After | 14 Days After |
|---|---|---|---|
| 1* | $5 \times 10^{15}(\Omega)$ | $2 \times 10^{13}(\Omega)$ | $4 \times 10^{13}(\Omega)$ |
| 2* | $1 \times 10^{13}$ | $7 \times 10^{13}$ | $3 \times 10^{14}$ |
| 3* | $5 \times 10^{16}$ | $9 \times 10^{16}$ | $1 \times 10^{17}$ |
| 4 | $3 \times 10^{11}$** | $9 \times 10^{9}$*** | $7 \times 10^{9}$ |
| 5 | $2 \times 10^{10}$ | $5 \times 10^{9}$ | $5 \times 10^{8}$ |
| 6 | $6 \times 10^{10}$ | $3 \times 10^{9}$ | $3 \times 10^{9}$ |
| 7 | $2 \times 10^{13}$ | $8 \times 10^{10}$ | $1 \times 10^{11}$ |
| 8 | $2 \times 10^{12}$ | $8 \times 10^{10}$ | $2 \times 10^{10}$ |
| 9 | $6 \times 10^{10}$ | $7 \times 10^{9}$ | $1 \times 10^{9}$ |
| 10 | $4 \times 10^{12}$ | $1 \times 10^{11}$ | $2 \times 10^{10}$ |
| 11 | $4 \times 10^{10}$ | $2 \times 10^{9}$ | $2 \times 10^{9}$ |
| 12 | $4 \times 10^{13}$ | $6 \times 10^{11}$ | $5 \times 10^{11}$ |

Samples 1* to 3* are Comparative Examples. : The value means the data observed after one day; *: This value means the data observed after 8 days.

TABLE 4

Surface Resistivity of Polyolefin (MK-112)/Antistatic-treated Inorganic Filler (ASF)(mixing ratio: MK112/ASF = 60/40 (wt %))

| | Sample No. | |
|---|---|---|
| Time Elapsed (day) | 13 | 14 |
| Just After | $1 \times 10^{15}$ | $7 \times 10^{10}$ |
| 24 | $7 \times 10^{11}$ | $7 \times 10^{9}$ |
| 783 | $5 \times 10^{14}$ | $1 \times 10^{10}$ |

TABLE 5

Volume Resistivity (Ω-cm) of EPDM/Antistatic-treated Inorganic Filler (ASF)(mixing ratio: EPDM/ASF = 100/90 (wt %))

| | Sample No. | |
|---|---|---|
| Time Elapsed (day) | 13 | 14 |
| Just After | $2 \times 10^{10}$ | $6 \times 10^{9}$ |
| 3 | $3 \times 10^{10}$ | $1 \times 10^{9}$ |

Each sample sheet was immersed in hot water of 40° C. for 24 hours and then the volume resistance was again determined.

| 3 | $1 \times 10^{8}$ | $8 \times 10^{7}$ |
| 18 | $1 \times 10^{10}$ | $2 \times 10^{8}$ |
| 82 | $1 \times 10^{12}$ | $2 \times 10^{9}$ |

TABLE 6

Volume Resistivity (Ω-cm) of Sulfur-crosslinked EPDM or NBR/Antistatic-treated Inorganic Filler (ASF)(mixing ratio: Sulfur-crosslinked EPDM or NBR/ASF = 100/90 (wt %))

| | Sample No. | |
|---|---|---|
| Time Elapsed (day) | 3 | 14 |
| Sulfur-Crosslinked EPDM/ASF | | |
| Just After | $2 \times 10^{14}$ | $2 \times 10^{9}$ |
| 7 | $7 \times 10^{14}$ | $2 \times 10^{8}$ |
| 17 | $2 \times 10^{15}$ | $5 \times 10^{8}$ |
| 700 | $3 \times 10^{15}$ | $2 \times 10^{10}$ |
| Sulfur-Crosslinked NBR/ASF | | |
| Just After | $5 \times 10^{10}$ | $1 \times 10^{10}$ |
| 7 | $7 \times 10^{10}$ | $2 \times 10^{9}$ |
| 17 | $7 \times 10^{10}$ | $7 \times 10^{8}$ |
| 700 | $7 \times 10^{10}$ | $1 \times 10^{9}$ |

What is claimed is:

1. A resin composition comprising a resin and an antistatic inorganic filler comprising an inorganic filler, an organic dispersant applied onto the surface of the inorganic filler and an organic antistatic agent applied onto the organic dispersant layer, wherein the organic dispersant is a cationic high molecular weight surfactant having an average molecular weight ranging from 1000 to 150000 which is a water-soluble cationic polymer comprising, as structural units, 10 to 99 mole % of a diallylamine salt and/or an alkyldiallylamine salt and 1 to 90 mole % of an acrylamide monomer, and the antistatic agent is an α-olefin sulfonic acid salt and/or an alkyl alcohol-ethylene oxide adduct sulfate.

2. A method for preparing an antistatic inorganic filler comprising the steps of wet-grinding an inorganic filler in the presence of an organic dispersant, drying the ground inorganic filler and then mixing it with an organic antistatic agent wherein the organic dispersant is a cationic high molecular weight surfactant having an average molecular weight ranging from 1000 to 150000 which is a water-soluble cationic polymer comprising, as structural units, 10 to 99 mole % of a diallylamine salt and/or an alkyldiallylamine salt and 1 to 90 mole % of an acrylamide monomer, and the antistatic agent is an α-olefin sulfonic acid salt and/or an alkyl alcohol-ethylene oxide adduct sulfate.

3. A method for preparing an antistatic inorganic filler comprising the steps of wet-grinding an inorganic filler in the presence of an organic dispersant, adding an organic antistatic agent to the resulting slurry of the ground filler and then drying the mixture, wherein the organic dispersant is a cationic high molecular weight surfactant having an average molecular weight ranging from 1000 to 150000 which is a water-soluble cationic polymer comprising, as structural units, 10 to 99 mole % of a diallylamine salt and/or an alkyldiallylamine salt and 1 to 90 mole % of an acrylamide monomer, and the antistatic agent is an α-olefin sulfonic acid salt and/or an alkyl alcohol-ethylene oxide adduct sulfate.

4. The resin composition of claim 1 wherein the inorganic filler is calcium carbonate.

5. The method of claim 2 wherein the inorganic filler is calcium carbonate.

6. The method of claim 3 wherein the inorganic filler is calcium carbonate.

* * * * *